H. A. HILLE.
RESILIENT TIRE.
APPLICATION FILED MAY 22, 1920.
1,402,359.
Patented Jan. 3, 1922.
2 SHEETS—SHEET 1.
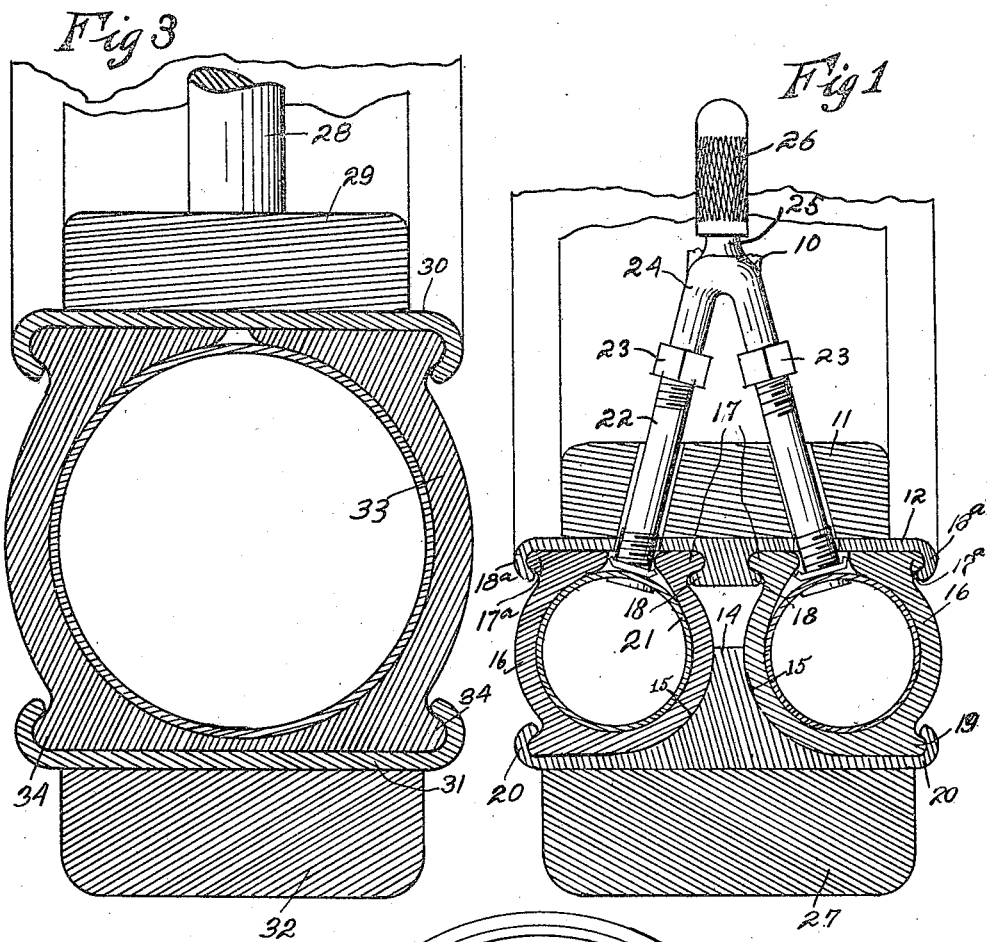
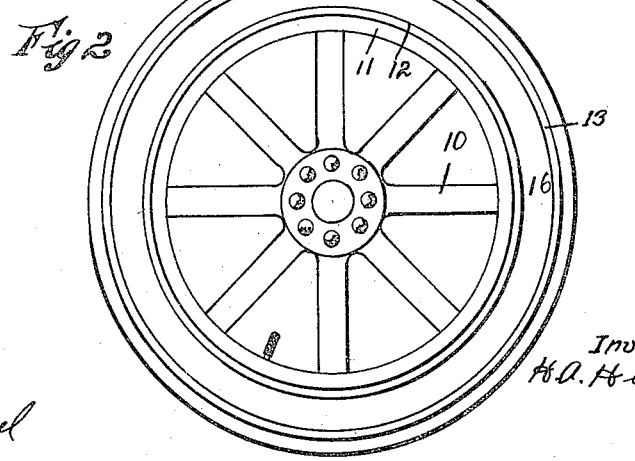
Inventor
H. A. Hille
By Orwig & Bair, attorneys
Witness
Nevin Trissel

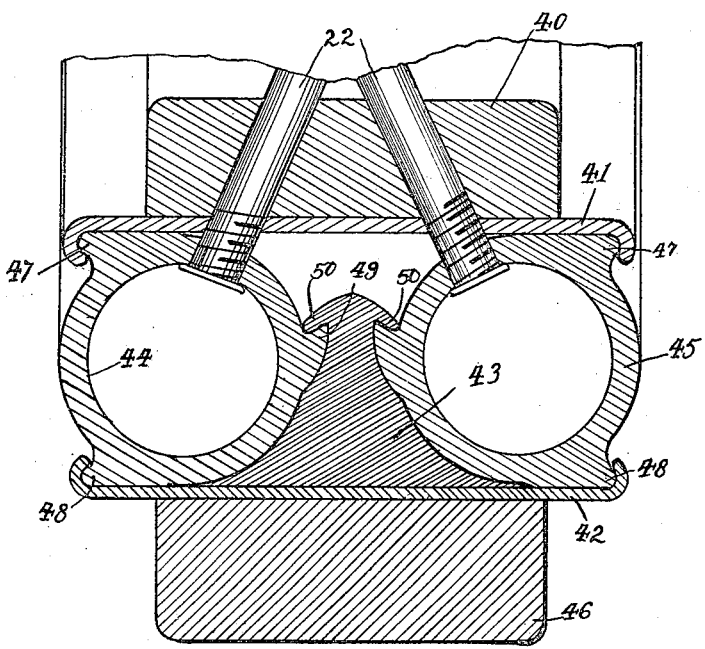
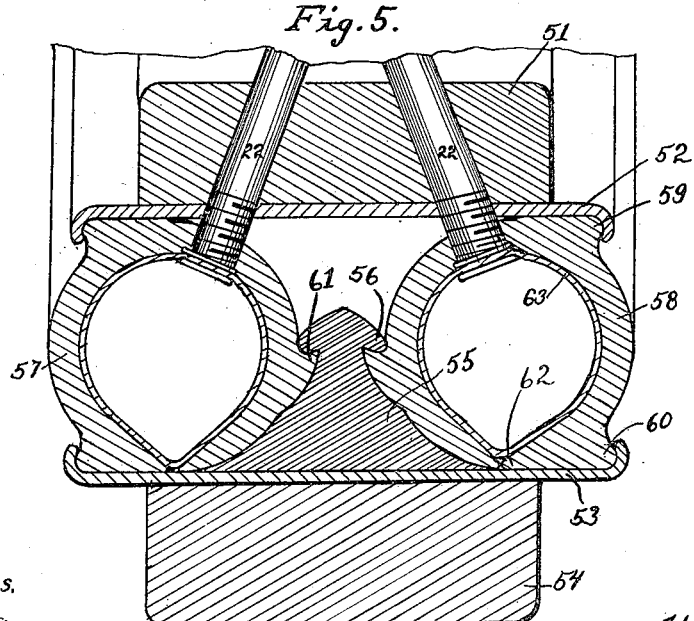

UNITED STATES PATENT OFFICE.

HANS A. HILLE, OF OSKALOOSA, IOWA.

RESILIENT TIRE.

1,402,359.

Specification of Letters Patent.

Patented Jan. 3, 1922.

Application filed May 22, 1920. Serial No. 383,595.

*To all whom it may concern:*

Be it known that I, HANS A. HILLE, a citizen of the United States, and a resident of Oskaloosa, in the county of Mahaska and State of Iowa, have invented a certain new and useful Resilient Tire, of which the following is a specification.

The object of my invention is to provide a resilient tire of the type using pneumatic tires and using an outside protection for the pneumatic tires, whereby the pneumatic tire is thoroughly protected, and more durable material is used for contact with the road surface.

With this and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a transverse, sectional view of a resilient tire embodying my invention.

Figure 2 shows a side elevation of the same, installed on a wheel.

Figure 3 shows a transverse, sectional view of another form of my invention.

Figure 4 shows a transverse, vertical, sectional view through another form of my tire; and Figure 5 shows a similar view through still another form.

In the form of my invention disclosed in Figures 1 and 2 I have used the reference numeral 10 to indicate generally a vehicle wheel having the felly 11 and the clincher rim 12.

Spaced outwardly from the rim 12 is what I shall call the outer rim 13 which may be generally of the clincher type. The rim 13 is provided with an inwardly extending, central annular rib 14, the sides of which are curved as at 15 to conform to the curvature of the pneumatic tire.

The device shown in Figure 1 is of the type particularly intended for use with trucks and heavy vehicles, and I have, therefore, provided two pneumatic tires 16. The tires are substantially of the ordinary type.

The rim 12 has at its central portion bead engaging members 18 in which the ordinary beads 17 of the opposite tires are received, and at its outer sides the bead engaging members 18ª in which the beads 17ª of the tires are received.

Each of the tires 16 has an additional bead 19 received in the bead engaging member 20 of the rim 13.

Received within each tire 16 is an inner tube 21 having a valve stem 22 extending inwardly through suitable openings in the rim 12 and felly 11, and preferably inclined toward each other.

The inner ends of the stems 22 are connected by union joints 23 with the arms of a Y-shaped tubular fitting 24. One arm of the Y-shaped tubular fitting 24 forms an ordinary valve stem 25 on which is the valve cap 26 through which both tires may be filled at once.

On the outer surface of the rim 13 is a tread member 27 which may be of rubber or any suitable material for the purpose.

In Figure 3 I have shown a form of my tire adapted for use where only one pneumatic tire is used.

In Figure 3 I have used the reference numeral 28 to indicate the wheel having the felly 29, and the ordinary clincher rim 30 having bead engaging members. Spaced outwardly from the clincher rim 30 is a similar oppositely faced clincher rim 31 having bead engaging members having on its outer surface a tread member 32 similar to the member 27.

I use with the form of the invention shown in Figure 3 a pneumatic tire 33 of the ordinary type, with the exception that at its outer tread portion and at its sides it has beads 34 coacting with the bead engaging portions of the rim 31.

In Figure 4 I have shown a wheel felly 40 on which is the wide rim 41 having bead engaging members and which, as shown, is of the clincher type. Spaced from the rim 41 is a rim 42 having bead engaging members, as illustrated, having the central inwardly extending dividing rib 43 curved to fit the tires 44 and 45 which are continuous tubes. On the outside of the rim 42 is a tread member 46. The tires 44 and 45 each have a bead 47 to engage the bead engaging members of the rim 41 and a bead 48 to engage the bead engaging members of the rim 42.

Each tire has also an intermediate bead 49 to engage a bead engaging member 50 at the inner portion of the rib 43. Secured to each tire 44 and 45 is a valve stem 22 such as that shown in Figure 1.

In the form of the device shown in Figure 4 I dispense with the inner tube since the tire is protected by the rim 42 and tread member 46 against road wear and puncture.

In Figure 5 I have shown a form of the device in which the inner tubes are used. The felly 51, rim 52, rim 53, tread member 54, rib 55 and bead engaging members 56 on the rib 55 are the same as the similarly named parts shown in Figure 4. In Figure 5 I have shown tires 57 and 58 having beads 59 for engaging the bead engaging members of the rim 52, beads 60 for engaging the bead engaging members of the rim 53 and beads 61 for engaging the bead engaging members 56. The tires 57 and 58 have openings 62 at their outer parts adjacent to the rim 53 to receive the inner tubes 63 which are provided with valve stems 22 similar to those already described which project through openings in the tires and through the rim 52 and felly 51.

When two pneumatic tires are used in a construction of this kind it is important that the portion of the pneumatic tires which engage the outer rim be prevented from sliding or moving relative to the outer rim and it is also important that sand, dust, and mud be prevented from entering between the pneumatic tires and the outer rim.

For these reasons I have provided annular beads formed on the tires at their outer or tread portions to engage with bead engaging members on the metal rim and also I have provided annular beads formed on the tires at the sides thereof that are adjacent to each other to coact with bead engaging members formed on the solid partition between the two tires. These beads and bead engaging members coact with each other in such manner that there can be no grinding or rubbing on that portion of the pneumatic tires between the two sets of beads and the bead engaging members just described, and in addition to this the entrance of sand, dust and mud between the pneumatic tires and the outer rim portion is prevented by coacting beads and bead engaging members at the outer portions of the pneumatic tires.

In the practical use of my improved tire, as illustrated it will be seen that the wear of the road surface is taken by the tread members 27, 32, 46 or 54 as the case may be, and yet the benefit of the pneumatic tire or tires is secured.

For heavy truck duty, two tires are preferable. The tires may be so connected together, as shown in Figures 1, 4, and 5, that the air therein may move from one tire to the other through the stems 22 and the fitting 24, so that at all times the pressure in both tires will be the same.

The curved surfaces 15 help to support the tires 16.

In the form of the device shown in Figure 3, the operation in practical use of the tire is practically the same.

Other forms of rims besides the clincher type may be employed.

My improved tires may be made in a considerable variety of forms, and it is my intention to cover by my claims any modified forms of structure or use of mechanical equivalents which may be reasonably included within their scope.

It is obvious that where my tire is used, a great saving in the expense of pneumatic tires will be effected.

I claim as my invention:

1. The combination with a vehicle wheel comprising a rim portion and a tread portion spaced apart from the rim portion, said rim portion having bead engaging members at its sides, and said tread portion having bead engaging members at its sides, of two tires arranged between the rim portion and the tread portion, each tire having a bead to interlock with the adjacent bead engaging member of the rim, and another bead to interlock with the adjacent bead engaging member of the tread portion, and each tire also being provided with a third bead on the portion thereof adjacent to the other tire, there being a bead engaging member on the wheel between the rim and tread portion to interlock with said third bead, for the purposes stated.

2. The combination with a vehicle wheel comprising a rim portion and a tread portion spaced apart from the rim portion, said rim portion having bead engaging members at its sides, and said tread portion having bead engaging members at its sides, of two tires arranged between the rim portion and the tread portion, each tire having a bead to interlock with the adjacent bead engaging member of the rim, and another bead to interlock with the adjacent bead engaging member of the tread portion, and each tire also being provided with a third bead on the portion thereof adjacent to the other tire, there being a bead engaging member on the wheel between the rim and tread portion to interlock with said third bead, said tread portion being provided with a projection to enter between and engage both tires, for the purposes stated.

Des Moines, Iowa, April 16, 1920.

HANS A. HILLE.